Jan. 5, 1960 J. G. OETZEL ET AL 2,920,300
COLLECTOR RING ASSEMBLY
Filed Dec. 18, 1953 2 Sheets-Sheet 1
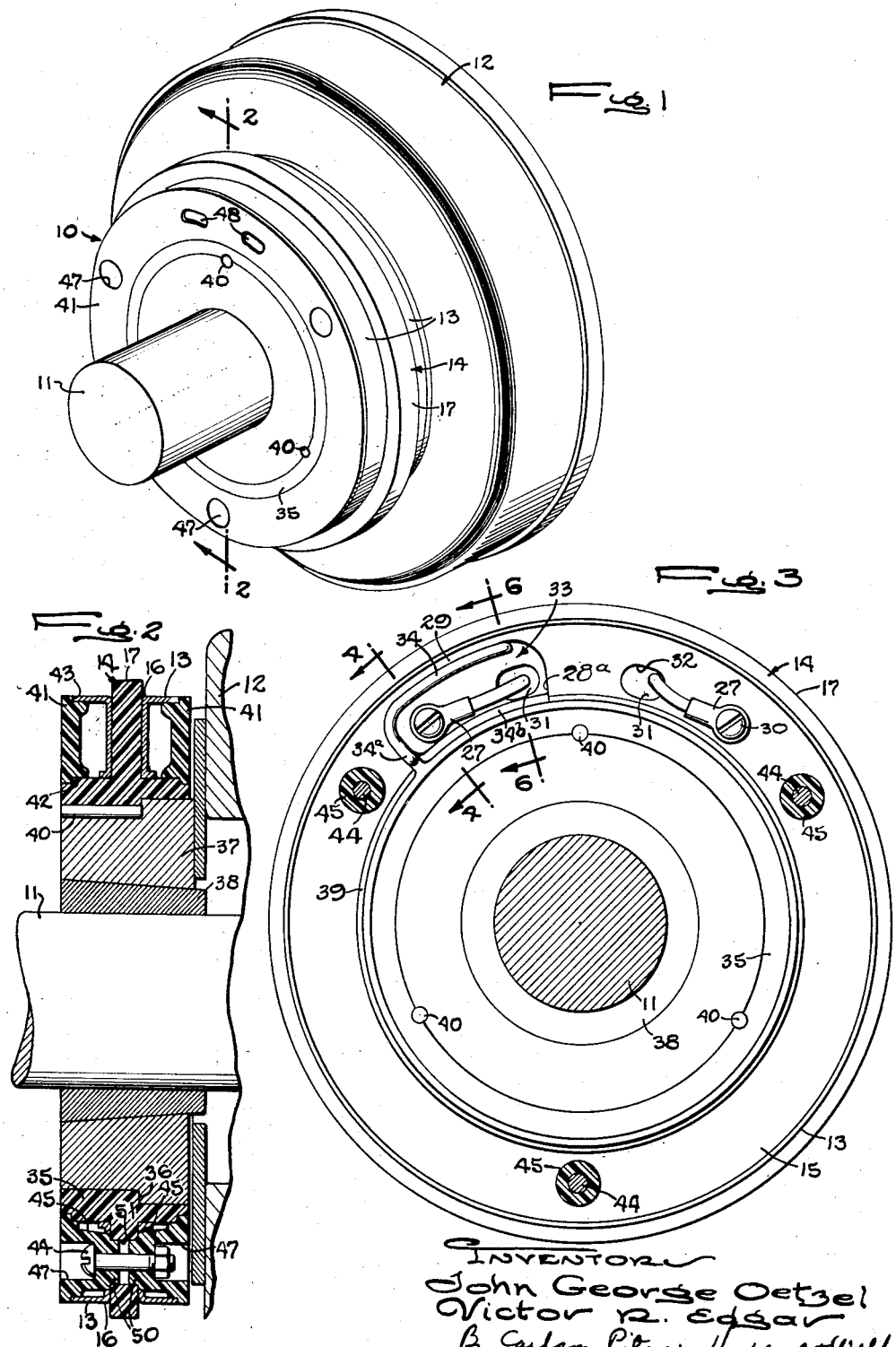

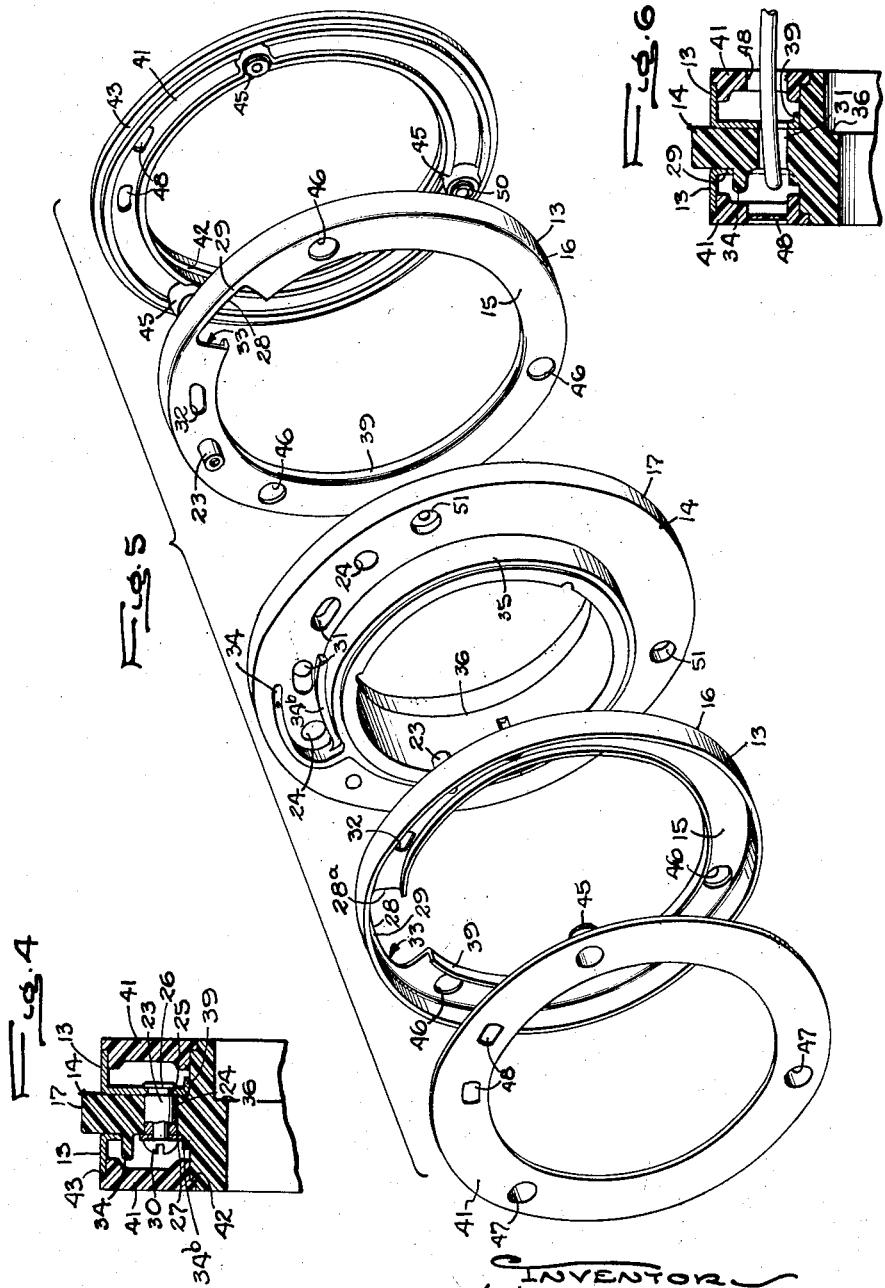

United States Patent Office 2,920,300
Patented Jan. 5, 1960

2,920,300

COLLECTOR RING ASSEMBLY

John George Oetzel and Victor R. Edgar, Beloit, Wis., assignors to Warren Electric Brake & Clutch Company, South Beloit, Ill., a corporation of Illinois Application December 18, 1953, Serial No. 398,974

10 Claims. (Cl. 339—8)

This invention relates generally to collector ring units or assemblies adapted to be mounted on a rotatable part and carrying collector or slip rings engageable by stationary contacts to conduct electric current to a winding on the part.

One object of the invention is to provide a novel collector ring unit which is rugged and light in weight, which is easy to assemble, and which is composed of parts that may be formed as simple plastic moldings and sheet metal stampings.

Another object is to construct the collector rings and insulating disks supporting the same in a novel manner to facilitate the connection of conductors to the rings and maintain the concentricity of the rings about their common axis in service use.

A more detailed object is to mount the collector rings between three axially spaced disks of insulating material which enclose the unit and are constructed in a novel manner to provide radial support for the rings at all points around their peripheries.

Other objects and advantages of the invention will become apparent from the following detailed description taken in connection with the accompanying drawings, in which:

Figure 1 is a perspective view of a collector ring unit embodying the novel features of the present invention and attached to a rotatable part.

Fig. 2 is a sectional view taken along the line 2—2 of Fig. 1.

Fig. 3 is an end view of the unit with one end removed.

Fig. 4 is a sectional view taken along the line 4—4 of Fig. 3.

Fig. 5 is an exploded perspective view of the unit.

Fig. 6 is a sectional view taken along the line 6—6 of Fig. 3.

In the drawings, the invention is shown for purposes of illustration embodied in a novel collector ring unit or assembly 10 adapted to be fastened on a rotatable part such as a shaft 11 for the conduction of electric current to a part, for example the winding of an electromagnetic clutch 12, mounted on and rotatable with the shaft. Generally, the unit comprises two axially alined cylindrical collector rings 13 of conducting material such as brass spaced apart by an insulator 14 and engageable on their exteriors with stationary contacts or brushes (not shown) through which electric current is conducted to the rings. The insulator 14 is a flat annular disk arranged coaxially with the rings and having its outer periphery 17 spaced radially beyond the rings. At their adjacent or inner ends 16, the rings are formed with inturned right angular flanges 15 which lie against opposite sides of the disk 14 and which are clamped against the latter in a manner to be described later.

Each flange 15 may be connected conveniently to a conductor 27 for transmitting electric current from its collector ring 13 to the winding of the clutch 12 and, for this purpose, carries an internally threaded binding post 23 (see Fig. 4). The latter projects axially from the inner side of its supporting flange and through an alined hole 24 in the insulator disk and has an axially facing shoulder 25 thereon clamped against the inner side of its supporting flange by upsetting the outer end 26 of the post against the outer side of the flange. Each post extends through the insulator disk far enough for attachment of a conductor terminal to either of its ends by a screw 30 threaded into the post.

To permit the conductors 27 to pass through the insulator disk 14 and the flanges 15 for attachment to either end of each binding post 23, circumferentially spaced conductor holes 31 (see Fig. 5) are formed in the disk between the binding post holes. Also, a hole 32 registering with one disk hole 31 is formed in each flange adjacent the binding post thereof. Contact between each flange 15 and a conductor terminal attached to the projecting end of the binding post 23 on the other flange is avoided by recessing each flange as indicated at 33 around the binding post of the other flange and the adjacent conductor hole 31 in the insulator disk. The possibility of contact and also of arcing between each collector ring 13 and the terminal of the conductor 27 connected to the other ring is reduced by interposing between the two an insulating barrier in the form of a rib 34 (Figs. 3 and 5) projecting axially from each side of the insulator disk 14 and into the adjacent recess 33 and extending first circumferentially around the disk and then radially and inwardly as indicated at 34a.

The rib 34 projecting from each side of the insulator disk 14 cooperates in a novel manner with the adjacent ring 13 to prevent flattening or so-called "run-out" of the latter radially and inwardly adjacent the recess 33. For this purpose, the circumferential defining edge 28 of the recess 33 lies along and contacts the outer radially facing surface of the rib so that the latter provides radial support for the inner end portion of the ring extending along the rib. While the recess defining edge 28 may be the inner side of the collector ring so that the rib contacts the latter, it is preferred to space this edge inwardly from the ring as shown to provide a lip 29 to strengthen the ring further against radial bending. In the present instance, the outer surface of each rib 34 and the mating recess edge 28 are curved along a line concentric with the common axis of the rings and the disk. Another rib 34b concentric with the axis of the disk extends circumferentially around the latter from the inner end of the radial rib portion 34a to abut a circumferentially facing part 28a of the recess edge 28 whereby to locate each collector ring angularly with respect to the disk 14.

To provide further assurance that the inner end portion of each collector ring 13 will remain concentric with the axis of the unit in service use, the ring preferably is made of U-shaped cross section with an inner cylindrical leg 39 which is shorter axially than the outer cylindrical leg 13 forming the collector ring proper. This inner leg encircles and has a tight press fit with one end portion of a cylindrical flange 35 concentric with the rings and projecting rigidly from the inner periphery of the insulator disk 14 and axially in opposite directions therefrom to receive and support both collector rings. With this construction of each ring 13, the bottom of the U constitutes the inturned flange 15 which is clamped against the insulator disk 14, the recess 33 of each ring being defined by cutting out a part of the inner cylindrical leg 39 as well as the flange.

The cylindrical flange 35 on the insulator disk 14 also constitutes a hub by which the unit 10 may be mounted on the shaft 11. To this end, the interior of the hub is formed with an angular shoulder 36 to engage a shoulder on an adapter sleeve 37 fitting into the hub. This sleeve is pressed on a collar 38 fast on the shaft 11 and has axially extending keyways registering with similar ways on the hub to receive keys 40 which hold the sleeve and the hub against rotation relative to each other.

In addition to providing radial support for each collector ring 13 and a mounting for the unit 10, the hub 35 on the insulator disk 14 cooperates with two outer annular cover disks 41 to enclose the unit and avoid the collection of dust or other foreign matter on the terminals of the conductors 27 and on the binding posts 23. For this purpose, the hub projects outwardly in opposite directions from the insulator disk far enough to cooperate with the outer end portions of the rings 15 and define annular recesses which receive the cover disks. To maintain the outer ends of the collector rings 15 concentric with the ring axis, the cover disks 41 are sized to fit snugly between the ring ends and the projecting ends of the hub, annular shoulders 42 and 43 on the inner and outer peripheries of the cover disks facing axially toward the insulator disk and into engagement with the hub ends and the outer ring ends.

The cover disks 41 are secured to the unit by clamping them to opposite sides of the insulator disk 14 as by bolts 44 (see Fig. 2) extending through registering holes formed in the insulator disk at three circumferentially spaced points and in three spacer bosses 45 projecting axially and inwardly from each of the cover disks. To permit the bosses to bear against opposite sides of the insulator, the ring flanges 15 are apertured as indicated at 46 to receive the bosses. Recesses 47 extending into the bosses from the outer sides of the cover disks locate the heads and nuts of the cover bolts well within the unit. In this instance, the inner ends 16 and the flanges 15 of the collector rings 13 are secured against opposite sides of the insulator disk 14 by clamping the rings between the insulator disk and the shoulders 43 on the cover disks 41.

To enable the conductors 27 to pass through the cover disks 41 and into the interior of the unit 10, the cover disks are formed with weakened portions 48 (Fig. 6) which may be knocked out to provide circumferentially spaced holes registering with the conductor holes 31 in the insulator disk 14. Assembly of the cover disks to the insulator disk 14 with these holes in registry is insured by making the bosses 45 of each cover disk and the mating boss holes of the insulator disk 14 of correspondingly different sizes so that each cover disk may be clamped to the insulator disk in only one angular position in which the holes register. For this purpose, projections 50 are formed on the inner ends of two of the spacer bosses 45 of each cover disk and the corresponding two of the bolt holes on each side of the insulator disk are enlarged as indicated at 51 (Fig. 5) to receive the projections. With this construction, the recesses are formed around one bolt hole on one side of the insulator, around a second bolt hole on the opposite side of the insulator, and around the third hole on both sides of the insulator so that the third hole is in effect defined by the walls of the recesses as shown in Fig. 2.

From the foregoing, it will be apparent that the collector rings 13 may be made as duplicate sheet metal stampings and the insulator and cover disks 14 and 41 may be made easily by molding a suitable thermosetting resin, the cover disks also being duplicates. These parts may be assembled after the disks have cooled simply by pressing the inner cylindrical legs 39 of the collector rings 13 onto the hub 35 of the insulator disk and bolting on the cover disks. Due to the snug fit between the hub 35 and the legs 39 of the collector rings 13 and between the ribs 34 and the defining edges 28 of the recesses 33, and also to the tight fit of the cover disks between the outer ends of the collector rings and the hub 35, the rings are able to withstand a substantial radial pressure from spring pressed brushes and still remain concentric with their axis thereby insuring good contact with the brushes at all points around the ring peripheries. The tight fit between the legs 39 and the hub 35 also is advantageous in enabling the flanges 15 to be retained against the insulator disk to permit removal of the cover disks without the necessity of separate securing means such as rivets. With the cover disks 41 closing the annular recesses between the outer ends of the collector rings 13 and the hub 35, the unit is effectually closed to the passage of dirt and dust into the unit.

We claim as our invention:

1. A collector ring unit having, in combination, a pair of axially spaced cylindrical rings of conducting material, an annular inner disk of insulating material separating said rings, an annular outer disk of insulating material fitting into the outer end of one of said rings and having a plurality of different sized bosses angularly spaced around and projecting axially from said outer disk toward one side of said inner disk, a second outer disk identical with said first disk and fitting into the outer end of the other of said rings with the bosses thereon projecting axially toward the other side of said inner disk, means on opposite sides of said inner disk defining axially opening recesses spaced angularly around and having different sizes corresponding to the different sizes of said bosses of each of said outer disks to receive the bosses with each of the outer disks disposed in a predetermined angular position relative to the inner disk, and means securing said rings and said disks together to form a rigid unit.

2. A collector ring unit having, in combination, a pair of axially spaced and axially alined cylindrical rings of conducting material, an inner annular disk of insulating material separating said rings and abutting the inner ends thereof, an annular outer disk of insulating material coaxial with said rings and said inner disk and fitting into the outer end of one of the rings, a plurality of angularly spaced bosses projecting axially from one of said disks toward the other disk and having different sizes, means on said other disk defining angularly spaced and axially opening recesses having different sizes corresponding to the different sizes of said bosses to receive the latter in a predetermined angular position of the disks relative to each other, a second annular outer disk of insulating material similar to said first disk and fitting into the outer end of said other ring, bosses and recess defining means on said inner disk and said second outer disk similar to said first bosses and recess means for positioning the inner and second outer disks in a predetermined angular position relative to each other, and means securing said rings and said disks together to form a rigid unit.

3. A collector ring assembly having, in combination, an annular disk of insulating material having a cylindrical hub projecting axially in opposite directions from the inner periphery thereof, a pair of rings of conducting material and of U-shaped cross section having flat annular bottoms lying against opposite sides of said disk and inner cylindrical legs concentric with and shorter than outer cylindrical legs thereof and snugly fitting said hub, said outer cylindrical legs and said hub cooperating to define annular recesses opening axially in opposite directions away from each other, two annular disks of insulating material fitting into said recesses and having inner peripheries fitting snugly onto said hub and outer peripheries fitting snugly into said outer cylindrical legs, and means securing said rings and disks together to form a rigid unit.

4. A collector ring unit having, in combination, a pair of axially spaced cylindrical rings of conducting material having inturned flanges at their adjacent ends, an annular inner disk of insulating material separating said rings and clamped to said flanges, two outer annular disks of insulating material one fitting into and telescoping closely with the outer end of each of said rings and clamped to the adjacent side of said inner disk, and a cylindrical flange rigid with the inner periphery of said inner disk and extending axially in opposite directions across the inner peripheries of said outer disks to enclose the unit and form a hub for attachment of the unit to a rotary part.

5. A collector ring unit having, in combination, an annular inner disk of insulating material, two axially spaced cylindrical rings of conducting material alined axially with said inner disk and abutting at their inner ends against opposite sides of the inner disk, a cylindrical hub integral with the inner periphery of said disk and extending axially on opposite sides thereof to cooperate with the outer ends of said rings to form two annular axially opening recesses, two annular outer disks of insulating material fitting into said annular recesses, and means clamping said rings and disks together to form a rigid unit.

6. A collector ring assembly having, in combination, a pair of axially spaced cylindrical rings of conducting material formed integral with flat disklike members at their adjacent inner edges, an annular inner disk of insulating material separating said rings and clamped on opposite sides to said members, two outer annular disks of insulating material one fitting into and telescoping closely with the outer end of each of said rings and clamped to the adjacent side of said inner disk, and a cylindrical flange rigid with the inner periphery of one of said disks to form a hub for connection of the assembly to a rotary part.

7. In a collector ring assembly the combination of, a first annular disk of insulating material having a cylindrical hub projecting axially from the inner periphery thereof, a ring of conducting material of U-shaped cross section encircling said hub and having an inner cylindrical leg fitting the hub snugly and a flat annular bottom abutting one side of said disk, a rib projecting axially from and extending circumferentially around said disk between said inner cylindrical leg and an outer cylindrical leg of said ring, means on said ring defining a recess to receive said rib and having an edge lying along and engaging the outer radially facing side of the rib to avoid flattening of said outer cylindrical leg adjacent said recess, and a second annular disk of insulating material secured to said first disk and having an inner periphery fitting snugly onto said hub and an outer periphery fitting snugly into said outer cylindrical leg of said ring.

8. In a collector ring assembly the combination of, a first annular disk of insulating material having a cylindrical hub projecting axially from the inner periphery thereof, a ring of conducting material of U-shaped cross section encircling said hub and having an inner cylindrical leg fitting the hub snugly, an outer cylindrical leg and a flat annular bottom abutting one side of said disk, and a second annular disk of insulating material secured to said first disk and having an inner periphery fitting snugly onto and telescoping with said hub and an outer periphery fitting snugly into and telescoping said outer cylindrical leg of said ring.

9. In a collector ring assembly, the combination of, an annular disk of insulating material, a cylindrical conducting ring having an integral disklike member on one end abutting one side of said disk with the latter and the ring alined axially, an arcuate rib concentric with said ring on the inner side thereof and projecting rigidly and axially from and extending partially around said disk, and means on said member defining a recess to receive said rib and having an arcuate defining edge concentric with and engaging the radially facing outer side of said rib to avoid flattening of said ring adjacent said recess.

10. In a collector ring assembly, the combination of, an annular disk of insulating material, a cylindrical conducting ring having an inturned flange on one end abutting one side of said disk with the latter and the ring alined axially, a rib projecting axially from and extending in a generally circumferential direction around said disk between said ring and the inner periphery of the disk, and means on said flange defining a recess to receive said rib and having a defining edge lying along and engaging the outer radially facing side of said rib to avoid flattening of said ring adjacent said recess.

References Cited in the file of this patent

UNITED STATES PATENTS

| | | |
|---|---|---|
| 1,431,295 | Evans | Oct. 10, 1922 |
| 1,450,172 | Dewald | Apr. 3, 1923 |
| 1,870,236 | Chervenka | Aug. 9, 1932 |
| 1,953,960 | Huffman | Apr. 10, 1934 |
| 2,471,808 | Baker | May 31, 1949 |
| 2,502,860 | Leithiser | Apr. 4, 1950 |
| 2,594,110 | Young et al. | Apr. 22, 1952 |
| 2,595,621 | West | May 6, 1952 |
| 2,751,565 | Johnston | June 19, 1956 |

FOREIGN PATENTS

| | | |
|---|---|---|
| 558,672 | France | May 30, 1923 |